Figure 1:
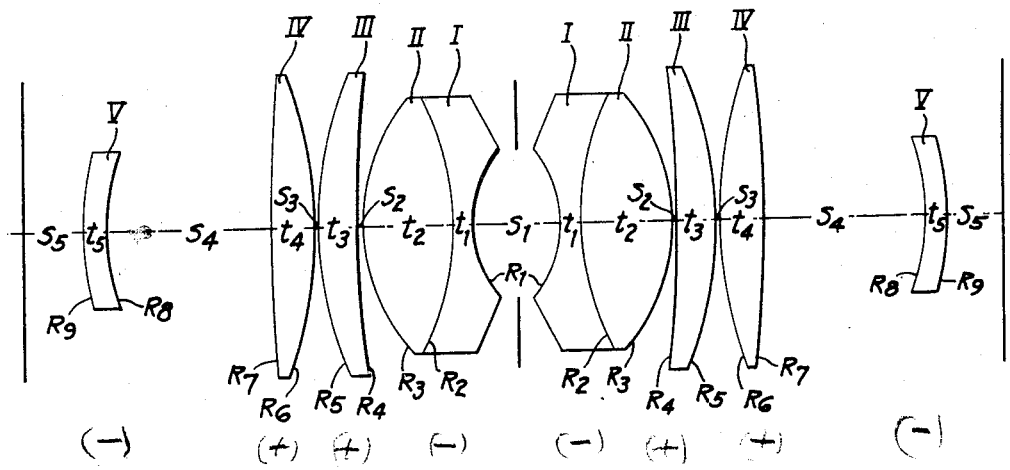

Sept. 13, 1949.    F. E. ALTMAN ET AL    2,481,639
HIGH-APERTURE COPYING LENS SYSTEM Filed Aug. 23, 1945    2 Sheets-Sheet 1

EXAMPLE 1, FIG. 1.

| OBJECTIVE: EF = 100 mm. | | | | (SYMMETRICAL) |
|---|---|---|---|---|
| LENS | N | V | RADII | THICKNESSES |
| -DIAPHRAGM- | | | | $S_1$ = 17.24 mm. |
| I | 1.689 | 30.9 | $R_1$ = -17.98 mm. | $t_1$ = 2.89 |
| II | 1.734 | 51.1 | $R_2$ = +52.5 | $t_2$ = 17.24 |
| | | | $R_3$ = -35.5 | $S_2$ = 0.49 |
| III | 1.755 | 47.2 | $R_4$ = -1561. | $t_3$ = 7.70 |
| | | | $R_5$ = -68.5 | $S_3$ = .49 |
| IV | 1.755 | 47.2 | $R_6$ = +90.1 | $t_4$ = 7.70 |
| | | | $R_7$ = -336. | BF = -41.1 |
| FIELD LENS | | | | $S_4$ = 47.1 |
| V | 1.517 | 64.5 | $R_8$ = -41.6 | $t_5$ = 3.8 |
| | | | $R_9$ = -77.5 | $S_5$ = 10.5 |
| SYSTEM:    EF = 53.4 mm. | | | | |
| HALF-SYSTEM: EF = 458 mm.,    APERTURE = f/1.86 | | | | |

FRED E. ALTMAN
CHARLES J. MELECH
INVENTORS

BY
ATT'Y & AGT

Sept. 13, 1949.  F. E. ALTMAN ET AL  2,481,639
HIGH-APERTURE COPYING LENS SYSTEM
Filed Aug. 23, 1945   2 Sheets-Sheet 2

FRED E. ALTMAN
CHARLES J. MELECH
INVENTORS

BY
ATTY & AG'T

Patented Sept. 13, 1949

2,481,639

UNITED STATES PATENT OFFICE 2,481,639

HIGH-APERTURE COPYING LENS SYSTEM

Fred E. Altman and Charles J. Melech, Rochester, N. Y., assignors to Eastman Kodak Company, Rochester, N Y., a corporation of New Jersey Application August 23, 1945, Serial No. 612,204

6 Claims. (Cl. 88—57)

This invention relates to high-aperture photographic objectives and lens systems for use at finite conjugates.

An object of the invention is to provide an extremely high aperture lens for the rapid copying of color pictures or negatives.

It is a particular object of the invention to provide a superior lens for the copying of lenticular color film at approximately unit magnification.

Other objects will be pointed out in connection with the following description.

The taking and copying of color pictures on lenticular film by the use of a banded color filter is a highly developed art. One of the difficulties encountered in this kind of work is the vignetting of one color band of the filter more than another, thus upsetting the color balance. A similar difficulty arises from the difference in the residual aberrations in the different parts of the lens aperture occupied by the several bands of the filter. Overcoming these difficulties taxes the highest skills of the lens designer's art.

One artifice which has been used in this connection in copying lenticular films (usually at unit magnification) is to print each color-separation image separately and successively using a wedge prism for some of the images as shown in U. S. Patent 2,039,691 to Tuttle. Aside from the inconvenience of this method, the prisms introduce astigmatism both on the axis and throughout the field, and thus materially lower the quality of the reproduction.

It is a further object of one embodiment of the present invention to provide an optical system for copying lenticular film which includes weaker prisms than those used heretofore.

It is an object of a preferred form of the invention to eliminate entirely the need for the wedge prisms without noticeably increasing the undesirable vignetting.

According to the present invention, a very high aperture objective suitable for use at finite conjugates is provided, comprising two compound meniscus negative components concave toward a diaphragm plane therebetween and axially aligned between two positive members each consisting of two simple positive elements of which the element adjacent the meniscus component has its weaker surface turned thereto. Each meniscus component comprises a biconcave element cemented to a biconvex element of higher refractive index, the index difference being between 0.006 and 0.08. Highly satisfactory results have been obtained with objectives in which the negative components consist entirely of these two elements. More complex structures can be used, however and will improve any small traces of aberrations that may remain.

Usually it is advantageous to divide the power of each positive member so that neither of the simple positive elements has a focal length greater than 2½ times that of the other. The central space and the bending of the simple positive elements are adjusted to balance out the ordinary aberrations such as astigmatism and spherical aberration. In this regard the outer positive element has more freedom of bending than the inner one. However it does appear that its outer surface should preferably have a power algebraically between $-0.25$ and $+1.0$ times the power of the whole element. These limits necessarily imply that the inner surface should be plano or convex.

Objectives according to the invention are very useful in many kinds of copying work where a high relative aperture is helpful. By combining one such objective with a pair of negative members whose focal lengths are greater than 3 F, one being spaced less than 0.25 F from each conjugate plane, F being the focal length of the objective, the band filter (or the corresponding rectangular aperture as is generally used in copying) is made to appear at the optimum distance as needed in this kind of work. A high aperture copying lens system is thus formed which with each half working at f/2.5 enables one to use much weaker prisms and at f/2.0 to dispense with the prisms entirely.

The special requirements of this kind of work are such that the zonal spherical aberration and the variation of spherical aberration with wavelength (so-called spherochromatism) are of much greater relative importance than in ordinary photography.

In objectives according to the invention, the introduction of the two-element positive members already mentioned greatly reduces the zonal spherical aberration, and according to a preferred arrangement, a further gain is made in this direction by the use of high index, low dispersion glass in at least one positive element in each half of the objective. We find that refractive indices between 1.68 and 1.85 and dispersive indices between 40 and 60 are very advantageous here. One or both of the simple positive elements or the element to which the biconcave element is cemented may be made of this high index glass, and for the very highest degree of correction, all three elements are so constituted.

Another preferred feature is a strongly curved cemented surface between the biconcave element and the biconvex element. This strong curvature cooperates with the feature of the index difference being between 0.006 and 0.08 to greatly improve the oblique spherical aberration. In a preferred form of the invention, the radius of curvature of this surface is between ⅓ F and ⅔ F.

Certain features of an invention disclosed in an Altman application, Serial No. 511,059, filed November 20, 1943, now Patent No. 2,401,324, issued June 4, 1946, are very advantageous in reducing the zonal spherical aberration, particularly the strongly curved concave surfaces and the unusually thick meniscus components.

We have found further than an aid in eliminating vignetting is to have the positive elements close to the conjugate film planes. This could be done by spacing them away from the meniscus components, but we prefer so to increase the power of the positive members that both principal focal points are within the body of the objective, that is between the vertices of the front and rear surfaces thereof. Thus the distance from each vertex to its film plane is then less than the focal length of the objective in the special case of copying at unit magnification.

Figure 3:
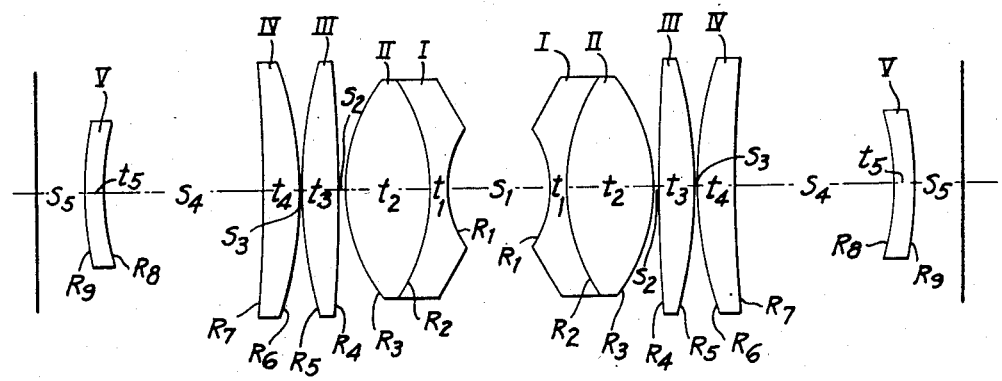
Figure 4:
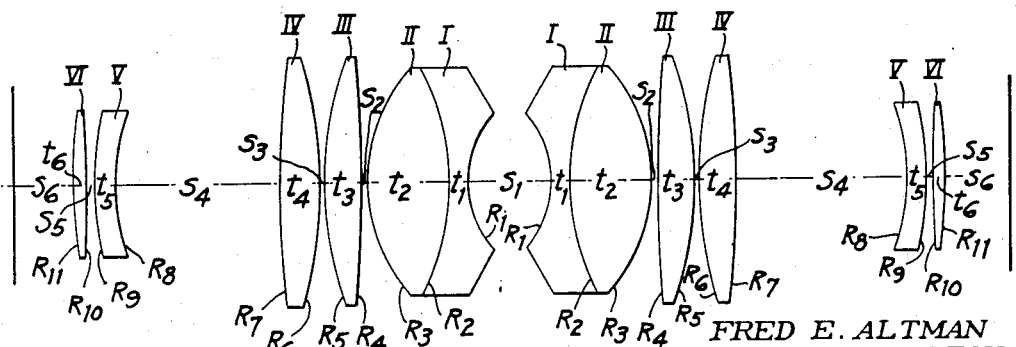

In the accompanying drawings:

Figs. 1, 3, and 4 show preferred forms of the invention.

Figure 2:
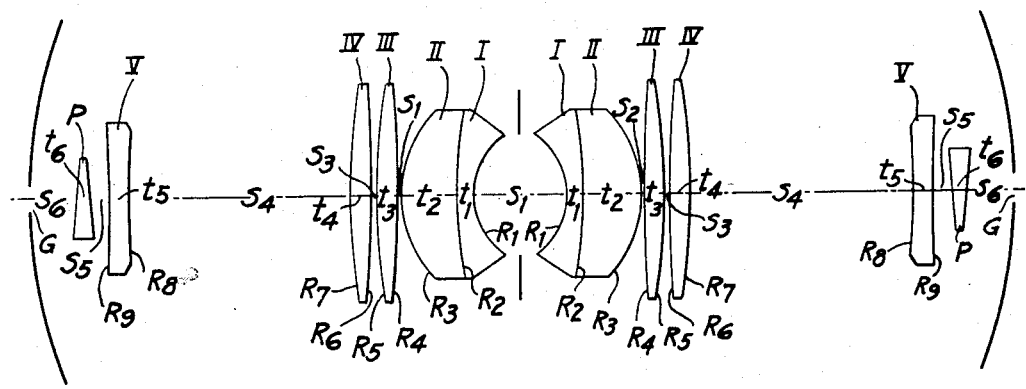

Fig. 2 shows another form of the invention.

Each of these systems is optically symmetrical with respect to the diaphragm. Such symmetry is particularly useful in printing at unit magnification because, as is well known, it automatically corrects coma, distortion, and lateral color aberrations.

The lens elements are numbered from the diaphragm outward in both directions. This is permissible because of the symmetry of the system. In each case lens elements I to IV make up each half of the objective. A negative member is added near each conjugate plane to make up an optical system for color copying at unit magnification. In Figs. 1 and 3 this negative member consists of element V, whereas the other two figures show other added optical parts described in greater detail below.

The radii R, thicknesses $t$, and axial spacings $s$ are likewise numbered from the diaphragm space outward, and have corresponding designations in the following tables of constructional data, in which the + and − signs indicate radii which are convex or concave, respectively, toward the diaphragm:

Example 1, Fig. 1

Objective: EF=100 mm. (symmetrical)

| Lens | N | V | Radii | Thicknesses |
|---|---|---|---|---|
| I | 1.689 | 30.9 | $R_1=-$ 17.98 mm. | $S_1=$ 17.24 mm. |
| II | 1.734 | 51.1 | $R_2=+$ 52.5 | $t_1=$ 2.89 |
|   |       |      | $R_3=-$ 35.5 | $t_2=$ 17.24 |
| III | 1.755 | 47.2 | $R_4=-1561.$ | $S_2=$ 0.49 |
|   |       |      | $R_5=-$ 68.5 | $t_3=$ 7.70 |
| IV | 1.755 | 47.2 | $R_6=+$ 90.1 | $S_3=$ 0.49 |
|   |       |      | $R_7=-$ 336. | $t_4=$ 7.70 |
|   |       |      |              | $BF=-41.1$ |

FIELD LENS

| Lens | N | V | Radii | Thicknesses |
|---|---|---|---|---|
| V | 1.517 | 64.5 | $R_8=-$ 41.6 | $S_4=$ 47.1 |
|   |       |      | $R_9=-$ 77.5 | $t_5=$ 3.8 |
|   |       |      |               | $S_5=$ 10.5 |

System: EF=53.4 mm.
Half-system: EF=45.8 mm; aperture=F/1.86.

Example 2, Fig. 2

Objective: EF=100 mm. (symmetrical)

| Lens | N | V | Radii | Thicknesses |
|---|---|---|---|---|
| I | 1.673 | 32.2 | $R_1=-$ 19.51 mm. | $S_1=$ 26.15 mm. |
| II | 1.697 | 56.1 | $R_2=+$ 275.5 | $t_1=$ 3.81 |
|   |       |      | $R_3=-$ 31.5 | $t_2=$ 16.20 |
| III | 1.755 | 47.2 | $R_4=+$ 578. | $S_2=$ 0.95 |
|   |       |      | $R_5=-$ 146.1 | $t_3=$ 5.70 |
| IV | 1.755 | 47.2 | $R_6=+$ 578. | $S_3=$ 0.95 |
|   |       |      | $R_7=-$ 146.1 | $t_4=$ 5.70 |
|   |       |      |                | $BF=-$ 7.6 |

FIELD LENS

| Lens | N | V | Radii | Thicknesses |
|---|---|---|---|---|
| V | 1.517 | 64.5 | $R_8=-$ 182.5 | $S_4=$ 68.0 |
|   |       |      | $R_9=\infty$ | $t_5=$ 5.7 |
|   |       |      |  | $\left(S_4+\dfrac{t_5}{N_5}+S_5\right)=23.8$ |

System: EF=71.4 mm.
Half-system: EF=71.2 mm; aperture=F/2.5.

Example 3, Fig. 3

Objective: EF=100 mm. (symmetrical)

| Lens | N | V | Radii | Thicknesses |
|---|---|---|---|---|
| I | 1.689 | 30.9 | $R_1=-$ 21.98 mm. | $S_1=$ 21.11 mm. |
| II | 1.697 | 56.1 | $R_2=+$ 41.30 | $t_1=$ 3.00 |
|   |       |      | $R_3=-$ 36.5 | $t_2=$ 18.22 |
| III | 1.755 | 47.2 | $R_4=+482.$ | $S_2=$ 0.49 |
|   |       |      | $R_5=-$ 94.1 | $t_3=$ 7.74 |
| IV | 1.755 | 47.2 | $R_6=+$ 72.9 | $S_3=$ 0.49 |
|   |       |      | $R_7=+670.$ | $t_4=$ 7.74 |
|   |       |      |             | $BF=-40.7$ |

FIELD LENS

| Lens | N | V | Radii | Thicknesses |
|---|---|---|---|---|
| V | 1.517 | 64.5 | $R_8=-$ 45.6 | $S_4=$ 48.25 |
|   |       |      | $R_9=-$ 82.0 | $t_5=$ 3.85 |
|   |       |      |  | $S_5=$ 9.35 |

System: EF=55.6 mm.
Half-system: EF=48.7; aperture=F/2.1.

Example 4, Fig. 4

Objective: EF=100 mm. (symmetrical)

| Lens | N | V | Radii | Thicknesses |
|---|---|---|---|---|
| I | 1.689 | 30.9 | $R_1=-$ 19.45 mm | $S_1=$ 17.60 mm. |
| II | 1.734 | 51.1 | $R_2=+$ 56.8 | $t_1=$ 3.12 |
|   |       |      | $R_3=-$ 38.4 | $t_2=$ 18.64 |
| III | 1.734 | 51.1 | $R_4=+4320.$ | $S_2=$ 0.53 |
|   |       |      | $R_5=-$ 76.5 | $t_3=$ 8.33 |
| IV | 1.734 | 51.1 | $R_6=+$ 95.8 | $S_3=$ 0.53 |
|   |       |      | $R_7=-$ 320.5 | $t_4=$ 8.33 |
|   |       |      |                | $BF=-36.4$ |

NEGATIVE MEMBER

| Lens | N | V | Radii | Thicknesses |
|---|---|---|---|---|
| V | 1.517 | 64.5 | $R_8=-$ 45.0 | $S_4=$ 48.5 |
|   |       |      | $R_9=-$ 83.9 | $t_5=$ 4.16 |
|   |       |      |               | $S_5=$ 1.22 |
| VI | 1.517 | 64.5 | $R_{10}=+633.$ | $t_6=$ 2.25 |
|   |       |      | $R_{11}=-205.$ | $S_6=$ 11.1 |

System: EF=83.6 mm.
Half-system, EF=48.8; aperture=F/2.0.

In all four cases it was found advantageous to have the radii R, spaces S, and thicknesses $t$ between the limits set forth in the following table:

| Radii | Thicknesses and Separations |
|---|---|
| $0.25\,F > -R_1 > 0.15\,F$ | $0.33\,F > S_1 > 0.13\,F$ |
| $5.0\,F > +R_2 > 0.33\,F$ | $0.05\,F > t_1 > 0.01\,F$ |
| $0.44\,F > -R_3 > 0.28\,F$ | $0.24\,F > t_2 > 0.14\,F$ |
| $\pm R_4 > 3\,F$ | $0.03\,F > S_2$ |
|  | $0.12\,F > t_3 > 0.04\,F$ |
| $2\,F > -R_5 > 0.5\,F$ | $0.03\,F > S_3$ |
| $+R_6 > 0.6\,F$ | $0.12\,F > t_4 > 0.04\,F$ |
| $\pm R_7 > 1.4\,F$ |  |

Fig. 1 (Example 1) is shown first because it is a preferred form. Chronologically, however, it followed Example 2, and will be described in that order for the sake of greater clarity.

Example 2 (Fig. 2) was the earliest to be developed. Each half of the system has a maximum aperture of about F/2.5 with respect to the collimated light in the diaphragm space. The system includes the objective, the negative field lenses, and in some cases two equal wedge prisms P, one near each film gate G. The function of the prisms is similar to that of the prior art except that the large aperture of the objective permits the use of weaker prisms than heretofore.

This system embodies features of the invention disclosed in Patent No. 2,401,324 already mentioned, and is disclosed therein as Fig. 4, although scaled up to a different focal length.

The spherochromatism of this lens is small, and the zonal spherical aberration is so highly corrected that it appeared that the objective could be made up in a still larger aperture, F/2.1 or faster. This would make possible a copying system without any prisms at all.

Example 1 (Fig. 1) was next developed. In this case the aperture of the half-system is F/1.86. The spherochromatism is well within tolerable limits, and the spherical aberration is very highly corrected for all zones even of this extremely high aperture. Thus a system was successfully made up which can be used without wedge prisms while still avoiding undesirable vignetting. An important factor in making these improvements is the preferred feature of the radius of curvature of the cemented surface being between one-third and two-thirds the focal length of the objective.

At this stage of development the value of the invention had been proven and the lens system had assumed approximately its final form. There remained as usual, however, the tedious task of balancing the residual aberrations which are reduced in magnitude but which can never be entirely eliminated.

One feature of the lens by which the zonal spherical aberration is reduced, namely the strongly curved and unusually thick meniscus components, also makes a negative contribution to the Petzval sum. This along with the negative contribution made by the negative field lenses V, overcorrected the Petzval sum of the entire system. In Example 1 this is considerably improved over the earlier Example 2, but still not at the optimum value necessary if the lens is to have a flat field of any considerable extent.

Example 3 shows a form of the invention adapted to cover a wider field with a slightly smaller aperture than Example 1. The negative Petzval sum is corrected by making the negative component a little less strongly meniscus. A slight undercorrection of color remaining in Example 1 is corrected by the use of a pair of glass types in the negative component differing more in dispersive index and, because of the limitations of available glass, differing less in refractive index. The latter condition called for a more strongly curved cemented surface to control oblique spherical aberration (often called rim rays) and this stronger surface in turn helped further in correcting the color.

Fig. 4 shows a system in which the negative Petzval sum and the color aberration of Example 1 are corrected by slightly different means. The index difference at the cemented surface of the meniscus component is maintained within the preferred range between 0.02 and 0.06 for best correction of rim rays, and the simple positive elements are made of a glass with a lower dispersion than that used in the other examples. The negative Petzval sum is corrected by using weaker negative members near the conjugate planes. The filter-apertures thereby appear at a greater distance from the film, a change that was accommodated for in the present instance by decreasing the curvature of the film gates.

The use of a two-element negative member is not considered essential to the invention although it is advantageous in correcting aberrations of the pupil which are very important in this art. The negative elements used in Examples 1 and 3 proved to be helpful in gaining a fine adjustment of oblique spherical aberration when the objective was designed in conjunction therewith. This fine correction was partly lost in certain experimental systems that were computed having a weaker negative element V, but when the negative member was weakened instead by adding a positive element VI nearer the image plane, this loss was negligible. Accordingly, this form shown in Fig. 4 was adapted for the immediate purpose at hand. However, for many purposes the single element as shown in Fig. 1 gives equally acceptable results.

We claim:

1. A large aperture photographic objective for use only at finite conjugates comprising two compound meniscus negative components concave toward each other and axially aligned between two positive members each consisting of two simple positive elements convex toward each other of which the element adjacent the meniscus component has its weaker surface turned thereto, in which the negative components have thicknesses between 0.15 F and 0.29 F and their concave surfaces have radii of curvature between 0.15 F and 0.25 F where F is the focal length of the objective and the powers of all the elements are such that the principal focal points lie between the front and rear surfaces of the objective.

2. An objective as claimed in claim 1 in which each of the two positive elements in each positive member has a refractive index between 1.68 and 1.85 a dispersive index between 40 and 60, and a focal length less than 2½ times that of the other element.

3. An objective as claimed in claim 1 in which each meniscus component consists of a biconcave element cemented to a biconvex element whose refractive index is higher by between 0.006 and 0.08, and the radius of curvature of the cemented surface is between one-third and two thirds of the focal length of the objective.

4. A large aperture photographic objective for use at finite conjugates comprising two halves in symmetrical arrangement with respect to a diaphragm therebetween, each half comprising a biconcave element nearest the diaphragm, a biconvex element cemented thereto, and two other positive elements airspaced therefrom, in which each of the three positive elements has a refractive index between 1.68 and 1.85 and a dispersive index between 40 and 60, the biconcave element has a refractive index less than that of the biconvex element by between 0.006 and 0.08 and a dispersive index between 0.6 and 0.75 times that of the biconvex element, and the curvatures R, the thicknesses t and the spacings S each numbered from the diaphragm space outward are within the range specified in the following table:

| Radii | Thicknesses and Spacings |
|---|---|
| $0.25 F > -R_1 > 0.15 F$ | $0.33 F > S_1 > 0.13 F$ |
| $5.0 F > +R_2 > 0.33 F$ | $0.05 F > t_1 > 0.01 F$ |
| $0.44 F > -R_3 > 0.28 F$ | $0.24 F > t_2 > 0.14 F$ |
| $\pm R_4 > 3 F$ | $0.03 F > S_2$ |
| $2 F > -R_5 > 0.5 F$ | $0.12 F > t_3 > 0.04 F$ |
| $+R_6 > 0.6 F$ | $0.03 F > S_3$ |
| $\pm R_7 > 1.4 F$ | $0.12 F > t_4 > 0.04 F$ | in which F is the focal length of the objective and the + and − signs indicate surfaces that are convex or concave respectively toward the diaphragm.

5. An objective according to claim 4 in which the two halves are identical within ordinary manufacturing tolerances.

6. An optical system for photographic copying of lenticular color films at substantially unit magnification comprising a symmetrical objective according to claim 4 and a negative member with focal length greater than 3 F spaced less than 0.25 F from each conjugate plane, F being the focal length of the objective.

FRED E. ALTMAN.
CHARLES J. MELECH.

REFERENCES CITED

The following references are of record in the file of this patent:

UNITED STATES PATENTS

| Number | Name | Date |
|---|---|---|
| 1,783,998 | Chretien | Dec. 9, 1930 |
| 1,945,977 | Oswald | Feb. 6, 1934 |
| 2,012,822 | Lee | Aug. 27, 1935 |
| 2,019,985 | Lee | Nov. 5, 1935 |
| 2,298,853 | Warmisham | Oct. 13, 1942 |
| 2,319,171 | Warmisham et al. | May 11, 1943 |
| 2,354,614 | Reason | July 25, 1944 |

FOREIGN PATENTS

| Number | Country | Date |
|---|---|---|
| 168,923 | Great Britain | Sept. 12, 1923 |